United States Patent [19]
Yuan et al.

[11] Patent Number: 5,609,919
[45] Date of Patent: Mar. 11, 1997

[54] METHOD FOR PRODUCING DROPLETS

[75] Inventors: Ding Yuan; Hani Henein, both of Edmonton; John A. Fallavollita, Victoria, all of Canada

[73] Assignee: Altamat Inc., Edmonton, Canada

[21] Appl. No.: 588,214

[22] Filed: Jan. 18, 1996

Related U.S. Application Data

[63] Continuation of Ser. No. 437,934, May 9, 1995, abandoned, which is a continuation-in-part of Ser. No. 230,712, Apr. 21, 1994, abandoned.

[51] Int. Cl.$^6$ ............................................. B05D 1/02
[52] U.S. Cl. ................................. 427/421; 427/427
[58] Field of Search ............................. 427/421, 427

[56] References Cited

U.S. PATENT DOCUMENTS

| | | | |
|---|---|---|---|
| 2,968,833 | 1/1961 | De Haven et al. | 18/2.4 |
| 4,428,894 | 1/1984 | Bienvenu | 264/9 |
| 5,171,360 | 12/1992 | Orme et al. | 75/331 |
| 5,183,493 | 2/1993 | Brandau et al. | 75/335 |
| 5,266,098 | 11/1993 | Chun et al. | 75/335 |

FOREIGN PATENT DOCUMENTS

| | | | |
|---|---|---|---|
| 0033717 | 1/1981 | European Pat. Off. | B05B 17/04 |

OTHER PUBLICATIONS

A Melt–Drop Technique for the Production of High–Purity Metal Powder, F. Aldinger, E. Linck, and N. Claussen, Modern Developments in Powder Metallurgy, vol. 9, P/M Proceedings of 1976 Intl. Powder Met. Conf., Chicago, Ill., U.S.A.

Development of Multi–orifice Impulsed Spray Generators for Heterogeneous Combustion Experiments, N. Ashgrizzadoh, S–C. Yao, pp. 433–439, Proc. ASME/JSME Thermal Engineering Joint Conf. Honolulu, Mar. 20–24, 1983.

Ink–Jet Printing, J. Heinzl, Advances in Electronics and Electron Physics, vol. 65 (1985), pp. 90–171.

A Study of Spray Forming Using Uniform Droplet Sprays, Jung–Hoon Chun and Christian H. Passow, Powder Production and Spray Forming: Advances in Powder Metallurgy & Particulate Materials—1992, vol. 1, Metal Powder Industries Federation, pp. 377–391.

Production of uniform–sized liquid droplets, N. R. Lindblad and J. M. Schneider, J. Sci, Instrum., 1965, vol. 42, pp. 635–638.

Characterization of Powders Produced by the Impulse Atomization Process, John Fallavolita, Ding Yuan, Hani Henein and Reg Eadie, EPD Congress, The Minerals, Metals and Materials Society, San Francisco, California, presented and published, Feb., 1994.

Model for Fluid Ejection and Refill in an Impulse Drive Jet, J. D. Beasley, Photographic Science and Eng., vol. 21, No. 2, 1977.

Preparation of Monosized Metal Powders by Pulsated Orifice Injection by Akira Kawasaki, Yasunori Kuroki and Ryuzo Watanabe, Proceedings of 1993 Powder Metallurgy World Congress, © Japan Society of Powder and Powder Metallurgy, pp. 27–30.

Drop Sizes From Low Speed Jets by Darell B. Harmon, Jr., Journal, Franklin Institute 259(1955), pp. 519–522.

Primary Examiner—Benjamin Utech
Attorney, Agent, or Firm—Anthony R. Lambert

[57] ABSTRACT

A method and an apparatus are provided for producing discontinuous streams of an inorganic substance, such as a metal, an alloy, a molten salt, slag or matte, or a slurry of ceramic particles, wherein the substance, in the form of a melt or slurry, is maintained in a container at the bottom of which at least one nozzle is provided containing at least one opening having a thickness that is large enough to withstand mechanical and thermal stresses and the melt or slurry is pushed through such opening(s) by means of an impulse applicator positioned over the opening(s) and operating in a periodic manner.

16 Claims, 15 Drawing Sheets

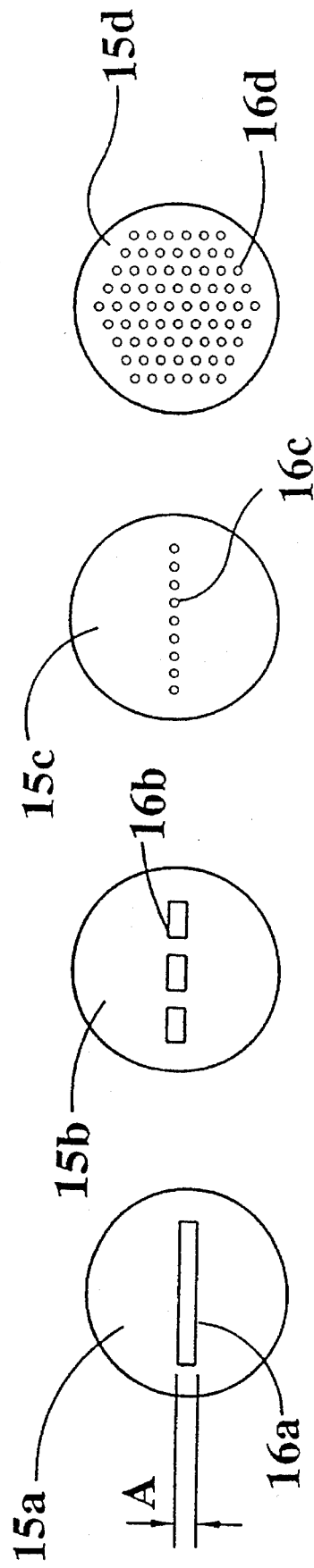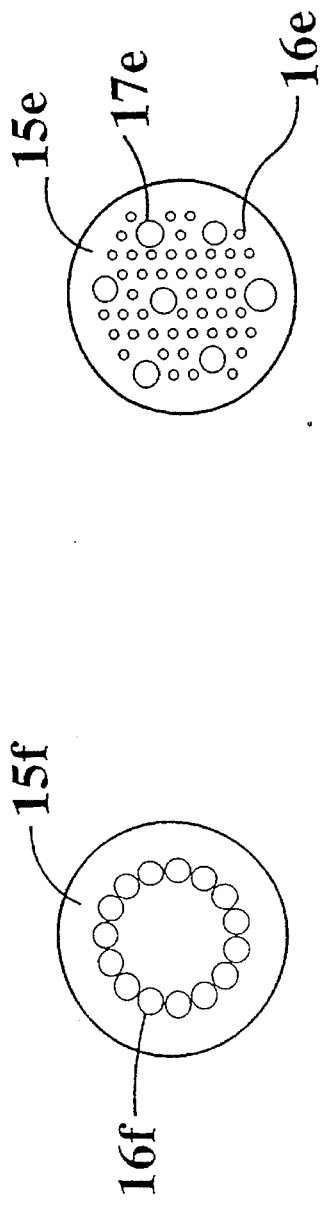

METHOD FOR PRODUCING DROPLETS

This application is a continuation of application Ser. No. 08/437,934, filed May 9, 1995, now abandoned which is a continuation-in-part of application Ser. No. 08/230,712, filed Apr. 21, 1994, now abandoned.

FIELD OF THE INVENTION

This invention relates to the production of droplets of inorganic substances, such as metals and their alloys, ceramics, molten salts, slags and mattes, or slurries.

BACKGROUND OF THE INVENTION

In the art of producing droplets of controlled size and distribution, there are two basic approaches, which may be described as "drop on demand" and "vibration of a continuous pressurized flow".

Drop on demand produces a single droplet or fewer from an orifice for each impulse of an impulse applicator, e.g. of a piezoelectric crystal such as that of Ashgrizzadeh and Yao, "Development of Multi-orifice Impulsed Spray Generators for Heterogeneous Combustion Experiments", Carnegie-Mellon University, Pittsburgh, Pa., Proc. ASME/JSME Thermal Engineering Joint Conf., Honolulu, Mar. 20–24, 1983, p. 433–439 (hereinafter referred to as Yao). This technique is used in ink jet technology, and has been proposed for production of metal droplets in "Preparation of Monosized Metal Powders by Pulsated Orifice Injection", by Akira Kawasaki, Yasunori Kuroki and Ryuzo Watanabe, Proceedings of 1993 Powder Metallurgy World Congress, ©Japan Society of Powder and Powder Metallurgy, p. 27–30.

Vibration of a continuous flow, see U.S. Pat. No. 4,428,894, and also described in Yao, is presently under consideration for industrial production of metal droplets. A continuous flow from an orifice is produced by a pressure applied to a fluid in a container and as the flow exits an orifice it is vibrated to cause instabilities in the fluid and therefore break it up into droplets. The pressure on the fluid produces a jet, which breaks up by Rayleigh instability into droplets. The length of the jet before it breaks up may be determined from the work of Harmon, Darell B., "Drop Sizes from Low Speed Jets", Journal of the Franklin Institute, 259 (1955), pp. 519–522. The jet is itself continuous with the fluid in the container. The droplets produced from the disintegrated jet are nearly spherical.

One of the main problems with the method of vibrating a continuous jet of molten metal or alloy is that the formed droplets tend to stick to one another in flight. This likely occurs because of the close proximity, in direction of flight, of the drops formed from a continuous jet vibrated at high frequency. Although the mechanism is not fully understood, it may be that since the droplet separation distance is typically quite small in such jets, the formation of smaller satellite drops will lead to coalescence which must be prevented or reduced by some particular means provided for that purpose. Thus, in one instance in the prior art, the drops are passed through a charging plate, once they are formed, so that they may be electrically charged and remain separate from one another. The use of such additional equipment makes the process for producing droplets more complex, costly and in some cases dangerous for adaption to a large-scale industrial plant. Also, by using overpressure to create continuous streams of metal it becomes more difficult to apply these techniques to discrete parts manufacturing since it is more difficult to start and stop the process.

For drop on demand, the droplets produced are single droplets believed to have a length that is less than $\pi$ times their diameter, as seen in the work of Kawasaki, or as may be calculated from volume conservation considerations from Yao. The technique as practised by Yao has not proven itself to produce monodisperse droplets, and does not permit flexibility in the control of the shape of the produced droplets. In addition, the stroke length of the impulse applicators of Yao and Kawasaki are very low, since they are produced by piezoelectric crystals, in the order of about 0.065 µm.

SUMMARY OF THE INVENTION

It is an object of the present invention to overcome the shortcomings of the prior art by providing a novel method and apparatus for manufacturing in a simple and efficient manner a tailored size distribution and mass flux of droplets, including monodispersed droplets, for the production of powder, coatings, laminates, strip casting or net form manufacturing.

Another object of the present invention is to provide a method and apparatus that can be used with various reactive, molten inorganic materials or slurries to produce discrete fluid segments from such materials.

Other objects and advantages of this invention will be apparent from the following description thereof.

The present invention is a new class of process distinct from each of the prior art techniques. In the present invention, repetitive impulses are applied to a fluid, with the impulses being sufficient to impel the fluid through the opening as elongate discrete fluid segments. The discrete fluid segments are what are believed to break up into plural discrete droplets. There may thus be several droplets produced from each impulse.

According to one aspect of the present invention, there is provided a method of atomizing a fluid, the fluid being held in a container having an inside and an outside, the container having an opening communicating between the inside and the outside of the container, the method comprising the steps of:

positioning the fluid adjacent the opening in the container; and repetitively applying impulses to the fluid in the direction of the opening with a frequency of at least 10 Hz, the impulses being sufficient to impel the fluid through the opening as elongate discrete fluid segments.

The fluid treated according to the method of the present invention can be a metal (e.g. Zn, Cu, Fe, Ca, Al), a metallic alloy (e.g. Sn—Pb, Al—Cu, Nd—Fe—B, Zn—Pb), a molten salt, slag or matte, or a slurry, such as an aqueous slurry of ceramic particles. Thus, the applications of the novel method will encompass powder metallurgy as well as the related field of ceramic powder production where, for example, superconducting metal oxide droplet sprays can be formed from the molten state at elevated temperature, or where spray drying of slurries is sought.

The method is primarily directed to the production of tailored narrow size distributions, including monodispersed sizes, of liquid or slurry droplet sprays. The lowest size range that may be achieved is typically between 1–100 µm and depends to some extent on the physical and chemical characteristics of the molten material or slurry. The upper size of the droplets formed by this method is only limited by the requirement that the fluid does not form a continuous jet at the exit of the opening under any overpressure over the liquid or liquid head.

Apparatus according to one aspect of the present invention comprises a container in a portion of which (preferably a lower portion) there is provided at least one nozzle containing at least one orifice or opening; and an impulse applicator for repetitively applying impulses to the fluid in the direction of the opening with a frequency of at least 10 Hz, the impulses being sufficient to impel the fluid through the opening as elongate discrete fluid segments.

In a further aspect of the apparatus, the impulse applicator includes a movable body having a bottom surface spaced from the nozzle in the container; and a generator of impulses attached to the movable body, the impulses being characterized by having an amplitude and frequency such that the fluid may be impelled through the opening as elongate discrete fluid segments. The movable body applies periodic impulses to the fluid in the container and for this reason is also referred to as an impulse applicator.

The container is preferably a crucible or tundish made of an appropriate refractory or ceramic material (e.g. alumina) in case of the fluid being a metal or alloy in molten form, but may also be made of metal, plastic or other suitable material. The opening in the container, along with the material surrounding the opening, forms a nozzle, and preferably there is a plurality of such openings.

The impulses applied by the impulse applicator are periodic in character and such that a discontinuous force applied to the fluid at the nozzle in the direction of flow creates a flow of elongate discrete fluid segments of material through the openings. The frequency of such impulses can be varied over a wide range (for example 10–20,000 Hz and conceivably as high as 60,000 Hz) with an amplitude or stroke of about 0.1–8 mm, preferably about 1–2 mm. This enables the pushing action through the nozzle to be performed impulse by impulse to achieve formation of a flow of elongate discrete fluid segments formed at the exit end of the nozzle.

The spacing of the movable body from the nozzle allows control over the mass flux of the ejected discontinuous stream. This distance is typically small (i.e., usually less than 10 mm) and is usually chosen so as to provide sufficient clearance between the applicator and the nozzle. Depending on the force that the impulse generator is capable of producing, this distance may be made larger. A tailored size distribution may be produced by using a nozzle with a plurality of openings with different diameters or by varying the period of each impulse. The time between each impulse is a function of the period of the oscillation and can be adjusted as desired. Also, a distinct mass flux of droplets can be engineered by arrangement of various numbers of openings in different geometric patterns and sizes in the nozzle. The method and apparatus described herein have the ability to rapidly control the start and end of the atomization process thereby providing a distinct advantage for discrete parts manufacturing.

The formed droplets can be allowed to solidify into a desired shape or react with the gas environment to allow control of the particle shape; they can also be contacted with droplets of another inorganic melt or with solid particles; a component thereof can be evaporated into such gaseous atmosphere; or they can impact with a substrate of desired geometry to form coatings, laminates or net form parts of monolithic materials or composites or strip casting.

In one aspect of the invention, the apparatus may consist of a vessel with two separate chambers, sealed from one another, an upper chamber and a lower chamber, with the container being located in the upper chamber and with the lower chamber being used for treatment of the produced droplets in a desired manner. The upper and the lower chambers are provided with means to maintain in each of them a desired pressure or vacuum. Thus, the hydrostatic pressure may be raised in the upper chamber to a level just below that required for the melt or slurry to form a continuous stream from the opening(s) and the impulse applicator is then used to apply a force to produce a flow of elongate discrete fluid segments from the opening(s). Also, instead of a single container, a container with a plurality of compartments may be used in the upper chamber each with a different melt or slurry and each with its own impulse applicator that would allow the laminating of a surface.

Also means can be included in the lower chamber to provide a stationary or flowing fluid with which the elongate discrete fluid segments are then allowed to react. For example, molten aluminum droplets could thus react with a $TiCl_4$ vapour to form $Al-TiAl_x$ composite powder. Also, this arrangement may be used to produce steel droplets from the reaction of pig iron streams with oxygen in the lower chamber. Moreover, means can also be provided to inject solids into the flow of elongate discrete fluid segments, thereby forming various composite materials.

Finally, a substrate or container of variable geometry may be placed below the flow of discrete fluid segments in the lower chamber to achieve spray forming of monolithic materials or composites or strip casting.

BRIEF DESCRIPTION OF THE DRAWINGS

There will now be described preferred embodiments of the invention, with reference to the drawings, by way of illustration, in which like numerals denote like elements and in which:

FIG. 2 is a top view of six nozzles with different types of openings that can be used within the method and the apparatus of the present invention;

DETAILED DESCRIPTION OF PREFERRED EMBODIMENTS

In this patent document, the term "elongate" is used to refer to discrete fluid segments whose length (measured in the direction of flow of the fluid through an opening of a nozzle) is at least $k\pi$ times and preferably many times the smallest or preferably any lateral dimension of the segments as they exit the nozzle.

k is found from the equation:

$$k = \left(1 + 3\frac{\eta}{\sqrt{\rho\sigma d_j}}\right)^{1/2}$$

in which $d_j$ is the diameter of the fluid segment, $\rho$ is the density of the fluid, $\eta$ is the viscosity of the fluid and $\sigma$ is the surface tension of the fluid. For non-viscous fluids, for example water and most metals, $1<k<1.005$, but for highly viscous fluids k is greater than 1, for example fluids such as selenium with a viscosity of 20 poise at 300° C. have $k\approx3.7$ (for $d_j$ about 500 μm).

The length of the elongate segments is determined in part by the amplitude of the applied impulses, and thus will typically be greater than about 0.1 mm.

In the case of elongate segments produced through a round or similar convex polyhedral shaped opening, the elongate segment will be thread-like or acicular. In the case of elongate segments produced through a slit, the elongate segments will be lamellar, forming sheets, flat or curved, whose smallest lateral dimension is the thickness of the segment. In the case of more complicated shapes, such as a cross, the smallest lateral dimension will be the thickness of one of the arms of the cross, but the length of the fluid segment may also be several times the width of the arms of the cross.

The term discrete indicates that the elongate segment itself is extruded from the opening and detached from the fluid reservoir in the container before breaking up into droplets. In the case of elongate lamellar segments (sheets), the elongate discrete fluid segments break up into ligaments first and then the ligaments break up and spheridize into spherical droplets.

In some cases, the elongate discrete fluid segments or ligaments may solidify before breaking up into spherical droplets, depending on the surface tension of the fluid, heat transfer from the fluid and the gas through which the fluid passes. For example, an acicular segment will produce an acicular powder if solidified before break up occurs.

Figure 1:
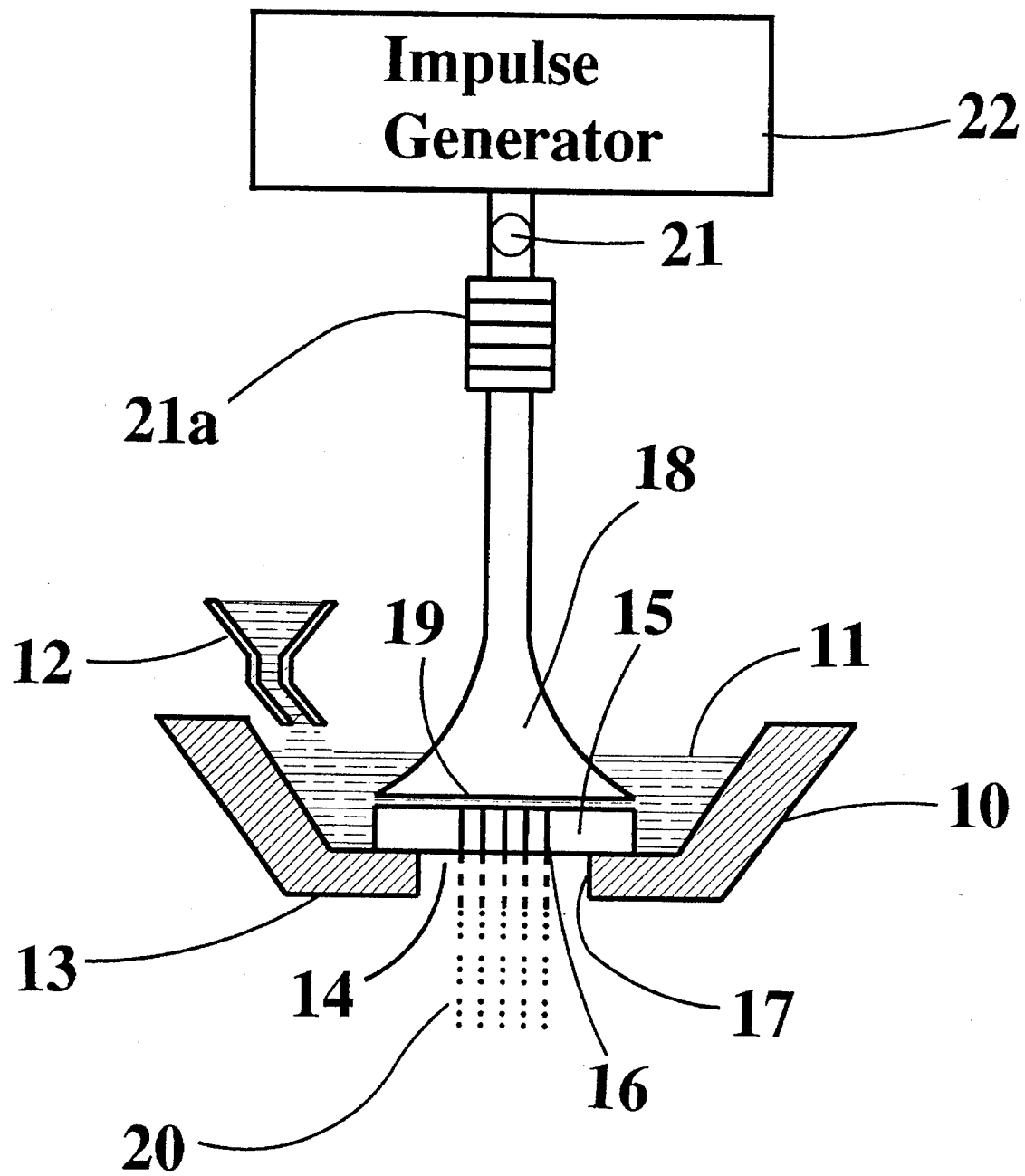
FIG. 1 shows a diagram of the basic apparatus for carrying out the method of the present invention.

Referring to the drawings, FIG. 1 shows a basic arrangement for carrying out the method of the present invention. A container 10 is provided into which a fluid formed of inorganic substance 11 is poured through spout 12, in the form of a melt or a slurry. If the inorganic substance 11 is a molten metal or alloy then container 10 will be a tundish made from a material such as refractory or metal capable of withstanding the temperature of such metal or alloy which can be anywhere between room temperature up to very high temperatures (e.g., in excess of 1700° C.), whereas if substance 11 is an aqueous slurry that can be handled at room temperature, container 10 can be made of another suitable material such as metal or plastic.

At the bottom 13 of container 10, there is provided an opening 14 (or a plurality of such openings) which is covered by a nozzle 15 (or a plurality of such nozzles) that has an opening 16 (or a plurality of such openings) pierced or drilled through it. Nozzle 15 is securely affixed to the bottom 13 so as to prevent any seepage of substance 11 through the seam 17 between nozzle 15 and bottom 13. Alternatively, the openings 16 can be drilled into the bottom 13 of the container 10 if no opening 14 is made. The size of the openings is preferably limited on the high end by a requirement that a continuous stream does not pass through the openings due to overpressure over the liquid or liquid head, and on the low end by the technology used to drill or otherwise make the openings. For example, a typical range is 20–20,000 μm. The droplet size produced is about twice the opening size. The fluid is positioned adjacent the opening 16 in the container 10, with the pressure on the fluid adjacent the opening inside the container being greater than the pressure on the outside of the container adjacent the opening. Adjacent the opening on the inside of the container in this context means sufficiently close that on impulse forces being applied to the fluid adjacent the opening, at least some fluid will pass through the opening. Adjacent the opening on the outside of the container means at the point of exit of elongate discrete fluid segments from the opening. The nozzle 15 need not be on the bottom of the container, but may be on the sides or even at the top with suitable configurations of the container, but is preferably on the bottom because of the simplicity of allowing gravitational forces to control the positioning of the fluid.

Above nozzle 15, there is provided a movable body or impulse applicator 18 having a bottom surface 19 positioned within the substance 11. Again, if substance 11 is a molten metal or alloy, the impulse applicator 18 must be made of a material that will withstand the temperature and chemical reactivity of the fluid, such as a suitable metal or ceramic (e.g., alumina). The bottom surface 19 of the impulse applicator 18 is spaced from nozzle 15, so that when discontinuous forces are applied by impulse applicator 18, substance 11 will be pushed through opening(s) 16 producing a flow of elongate discrete fluid segments 20 ejected through opening 14 of the container 10. To produce impulses, the impulse applicator 18 is connected via connector 21 to an impulse generating device 22 which produces impulses at desired frequencies and with sufficient force to push substance 11 through openings 16 to form a flow of elongate discrete fluid segments. Also, the distance between surface 19 and nozzle 15 can be adjusted by adjusting means 21a. Nozzles 15 are usually made of refractory discs that may have various opening geometric and grid patterns. Conceivably the impulses may be applied to the fluid using gas pressure waves, but this technique is not preferred and an impulse applicator formed of a movable body is preferred.

In FIG. 2 typical discs 15a, 15b, 15c, 15d 15e and 15f are illustrated from a top view. Thus, disc 15a has a single opening 16a in the form of an elongate rectangle or slit. Elongate discrete fluid segments produced from such a slit are lamella in shape, forming sheets, and if solidified in an appropriate medium, form solid sheet-like segments. Disc 15b has three rectangular openings 16b. Disc 15c has a plurality of circular openings 16c positioned in a straight line. Disc 15d shows a grid pattern of circular openings 16d. Disc 15e shows a nozzle with openings 16e, 16g of different diameters, thus allowing variably sized droplets to be produced with a tailored size and flux distribution that is in part dependent on the size distribution of the openings. Disc 15f shows a suitable distribution of openings for making a washer. In this case, the openings 16f are distributed in the form of an annulus in the nozzle. The openings 16f are thus configured in a shape corresponding to the shape of an object (the washer) to be spray formed. A tubular segment or like object may be produced by providing fluid to an annular opening, the central stop of the opening being provided by a rod protruding into the opening from the inside of the container. It should be noted that these are only examples of various opening geometries and patterns and that they may be adjusted according to the final product form.

The thickness of the nozzle 15 or discs 15a, 15b, 15c, 15d, 15e and 15f which corresponds to the length of the opening(s) 16 or 16a, 16b, 16c, 16d, 16e, 16f and 16g should be large enough to withstand both mechanical stresses due to impulse action, and the corrosion and erosion due to the high velocity elongate discrete fluid segments. The openings may taper, that is the diameter of the openings may vary along the flow direction of the openings with a magnitude that depends on the materials being processed. For non circular openings such as 16a and 16b, the dimension A (FIG. 2) may vary in the direction of flow. The appropriate length to diameter ratio of the openings is a function of the operating conditions, liquid characteristics, and desired finished product properties. In most cases this ratio is greater than 1, but ratios less than this value can be used without departing from the teachings of this patent document. The nozzles should also be made of materials such that the nozzles will withstand high temperature and the mechanical stresses produced by the impulses and will endure prolonged exposure to corrosion and erosion during the formation of the discontinuous stream of liquid. The openings 16 should have a size such that the fluid does not pass through the openings without the application of exterior forces.

Figure 3:
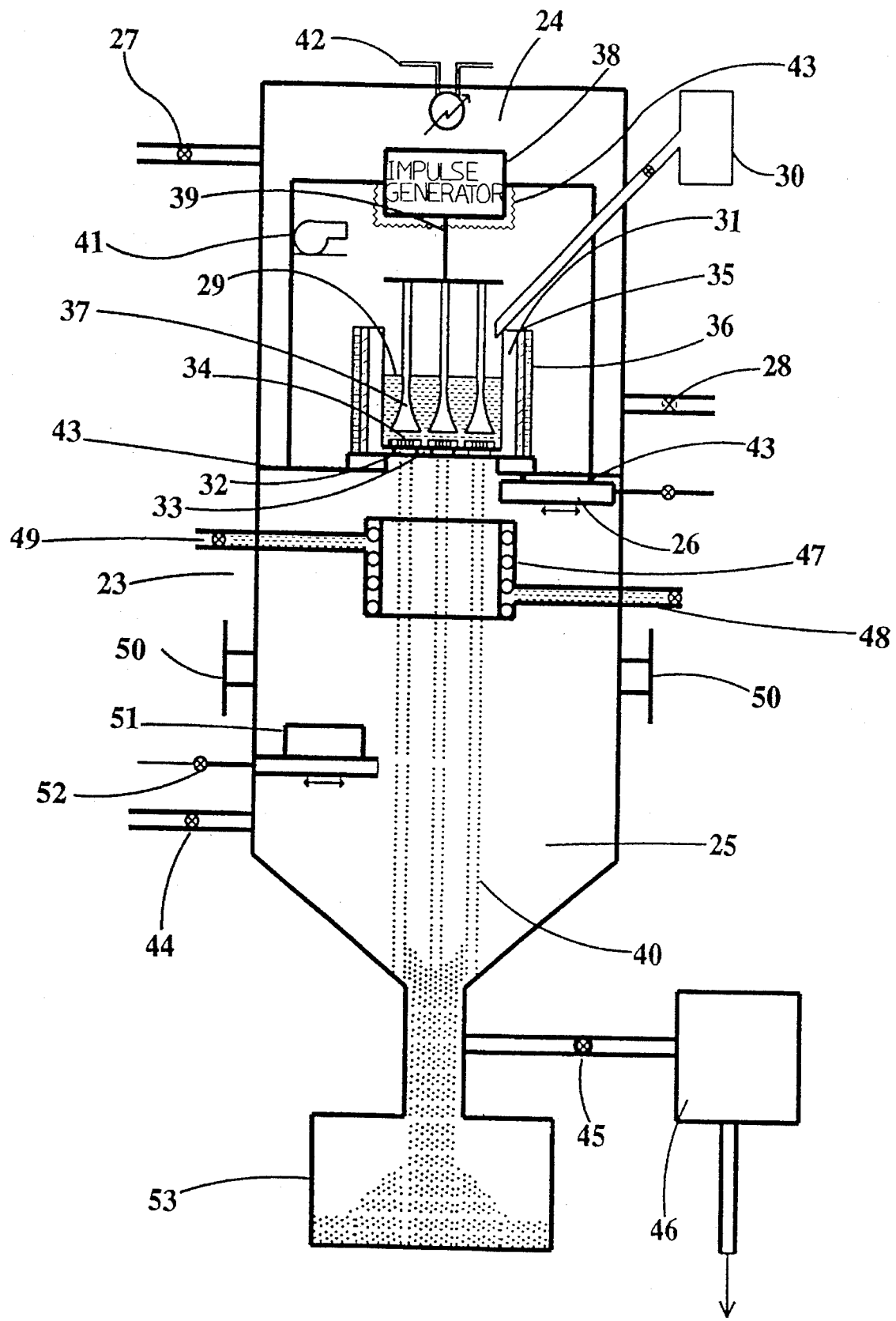
FIG. 3 shows a diagram of a more complex apparatus for carrying out the method of the present invention, including two separate chambers, an upper chamber and a lower chamber, and the various equipment employed therewith.

In FIG. 3 a more complex system according to the present invention is illustrated. It shows an atomization tower 23 with an upper chamber 24 and a lower chamber 25, which can be sealed from each other by a pneumatically actuated O-ring seal 26. The upper chamber 24 can be pressurized with a variety of gas types or evacuated through openings 27 and 28. A source of fluid material or slurry 29 is replenished from a sealed container 30 which contains the same. A container 31 in this case a crucible with a plurality of holes 32 in its bottom 33, covered by nozzles 34, is located in the upper chamber 24 and is adapted to contain the molten material or slurry 29. A heating assembly such as a resistance or induction furnace 35, 36 forming a heater with a heating surface abutting against the container 31 is used to attain the desired temperature of the molten material 29. If the material 29 is an aqueous slurry then it is not necessary to use assembly 35,36. The nozzles 34 are sealed to the edges of the holes 32 on the bottom 33 of container 31. These nozzles are thick, in the order of 0.1–25 mm thick, and contain openings that are drilled or otherwise made by known techniques, for example by lasers, so as to produce a minimum taper along the flow axis. The thickness of the nozzles is selected to be large enough to withstand the mechanical stresses due to the impulse action. The taper preferably is formed so that the opening widens from the outside of the container towards the inside. Reversed tapers (widening from the inside out) do not work as well. The taper may be made by the natural expansion of the laser beam width.

The molten material or slurry 29 is subjected to an impulse force by means of a plurality of impulse applicators 37 and thereby is pushed through the openings. The impulse force can be obtained by a variety of means, for example, by electrically-driven or pneumatic devices 38 operating with a periodic character. The frequency of the impulses may vary between 10 and 60,000 Hz, with a stroke of about 0.1 mm to 8 mm, preferably 1–2 mm.

The impulse forces are transferred to the impulse applicators 37 by a mechanical connector 39. It is desirable that the bottom surface of the applicators 37 be aligned at such a distance from the nozzles 34 such that the force applied to the liquid 29 be sufficient to eject a flow of elongate discrete fluid segments. Prior to the start-up of the impulse generator 38, the distance between each applicator-nozzle pair can be adjusted as desired. During an atomization run, the impulse applicators 37 are made to oscillate by means of impulse generator 38 and connector 39 in a periodic fashion in the longitudinal direction. The impulse amplitude and periodicity and hence force applied to the molten material or slurry 29 by applicators 37 are controlled so as to eject a flow of elongate discrete fluid segments from the openings which, unless they solidify fast enough, rapidly break up into a drop or droplets 40 below the nozzles into the lower chamber 25 of the atomization tower 23.

A fan 41 blows chamber gas onto the connector 39 to maintain it at a temperature that is as low as possible. Also, a heat exchanger 42 is provided in the upper chamber 24 to maintain the gas temperature therein as close as possible to room temperature or only slightly above it. In addition, cooling coils 43 are provided at various locations in the upper chamber 24 to prevent overheating due to radiation, conduction or convection when the material 29 is a molten metal or alloy. This arrangement is ancillary to the performance of the invention and can be considerably altered without affecting the outcome of the method.

The elongate discrete fluid segments are propelled into the lower chamber 25 of the tower 23 at velocities that can be varied by adjusting the applied impulse force of impulse generator 38. The lower chamber 25 may be evacuated or pressurized by gas of a variety of compositions to any desired pressure by means of the inlet and exit ports 44 and 45, respectively. The shape of the droplets or the segments may, in fact, be varied from spherical in the case of droplets to rod-like in the case of segments depending on the type and composition of fluid or combination of fluids in the lower chamber.

The atmosphere in the atomizing lower chamber 25 may consist of inert gases with varying oxygen levels. In such a case, an oxygen analyzer 46 may be used to provide a continuous sampling of the atmosphere. The descending droplets 40 or segments may be cooled by a cooling device 47 by allowing a continuous flow of coolant through openings 48, 49. This cooling device 47 may be particularly useful for alloys that have a wide melting temperature range, such as superalloys or rare-earth based magnetic alloys (e.g. Nd—Fe—B) or when a finer microstructure is desired. It is used to accelerate cooling so that segments or droplets are solid by the time they reach the bottom of the tower or, alternatively, to provide some measure of control over the solidification rate of the segments or droplets when conducting spray deposition. View ports 50 are provided to view the falling segments or droplets and allow diagnostic measurements to be made such as with high speed camera, video camera, and laser Doppler anemometer. A substrate or container 51 of variable geometry may also be positioned in the path of the falling segments or droplets 40 to allow spray deposition. This substrate or container 51 can be heated or cooled through inlet 52. Alternatively, the segments or droplets may be allowed to fall directly into the powder collector 53. The powder collector may or may not contain a liquid and may be located at a variable height along the tower.

Figure 4:
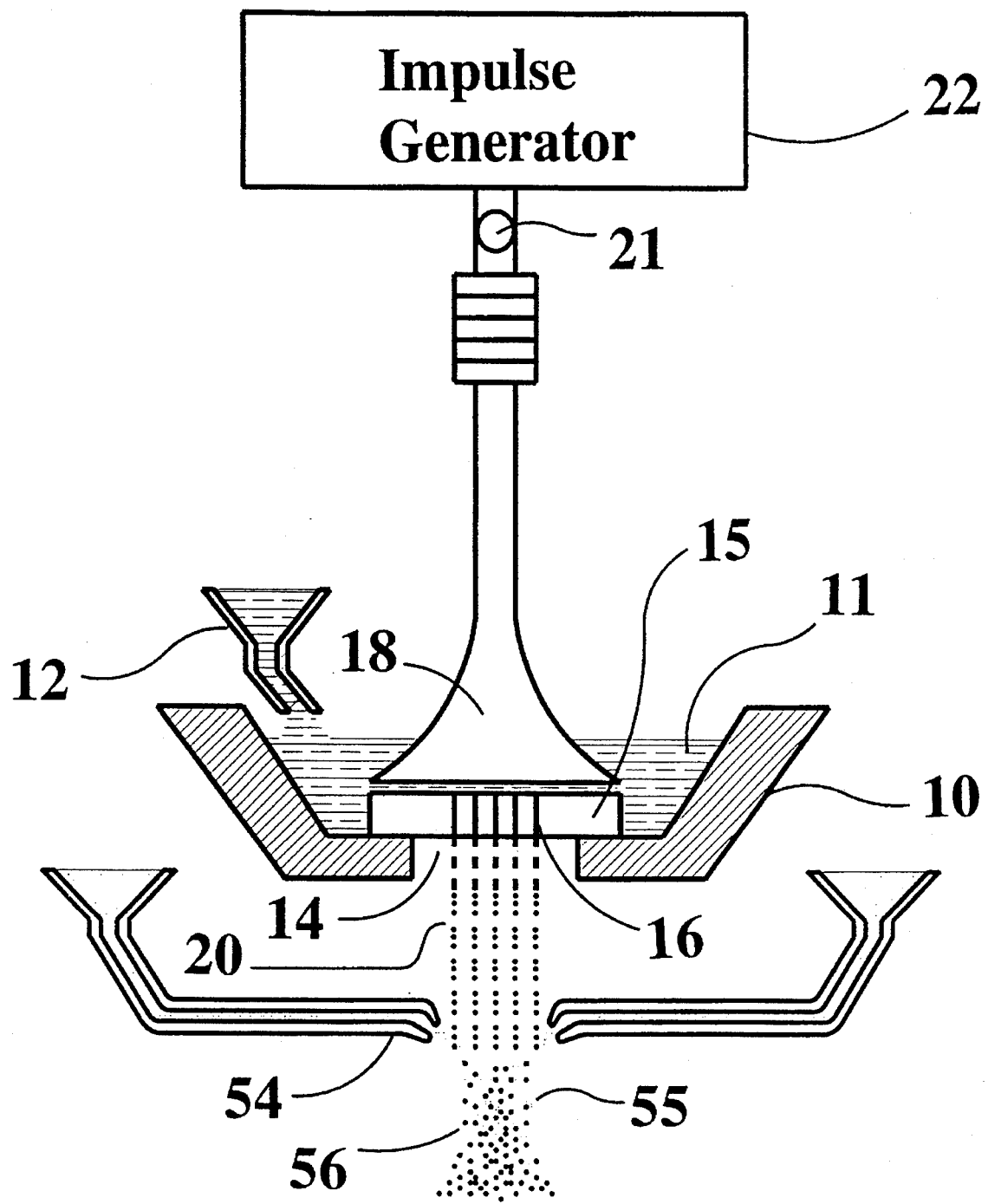
FIG. 4 shows a diagram of an apparatus such as shown in FIG. 1, but including an addition of a powder spraying system for production of composite powders.

FIG. 4 illustrates an arrangement such as shown in FIG. 1, but further having means for combining the resulting segments or droplets with extraneous powder or fluid to produce composite powders or to cool the segments or droplets or to react them with other materials. In this figure, the same elements as in FIG. 1 are identified by the same reference numbers. Thus, substance 11 is introduced into tundish 10 via a spout 12. The tundish has a hole 14 (or a plurality of such holes) at its bottom with a nozzle 15 (or a plurality of such nozzles) sealed over said hole(s). When through the pulsating action of impulse applicator(s) 18, produced by impulse generator 22, substance 11 is pushed through openings 16 to produce a flow of elongate discrete fluid segments that breaks-up into droplets 20 (unless the segments solidify before droplet formation can occur), there can be provided, at the exit of these droplets from the tundish 10, a nozzle assembly 54 though which a supply of an extraneous material can be ejected to contact the falling droplets at a predetermined location 55 to form a composite powder 56. This extraneous material can be a solid material, such as powder or it may be a source of fluid at low velocity so as not to shear the segments or droplets into smaller fragments; such fluid may be used to cool the droplets or alternatively it may react with the segments or droplets to form chemically altered materials.

Figure 4A:
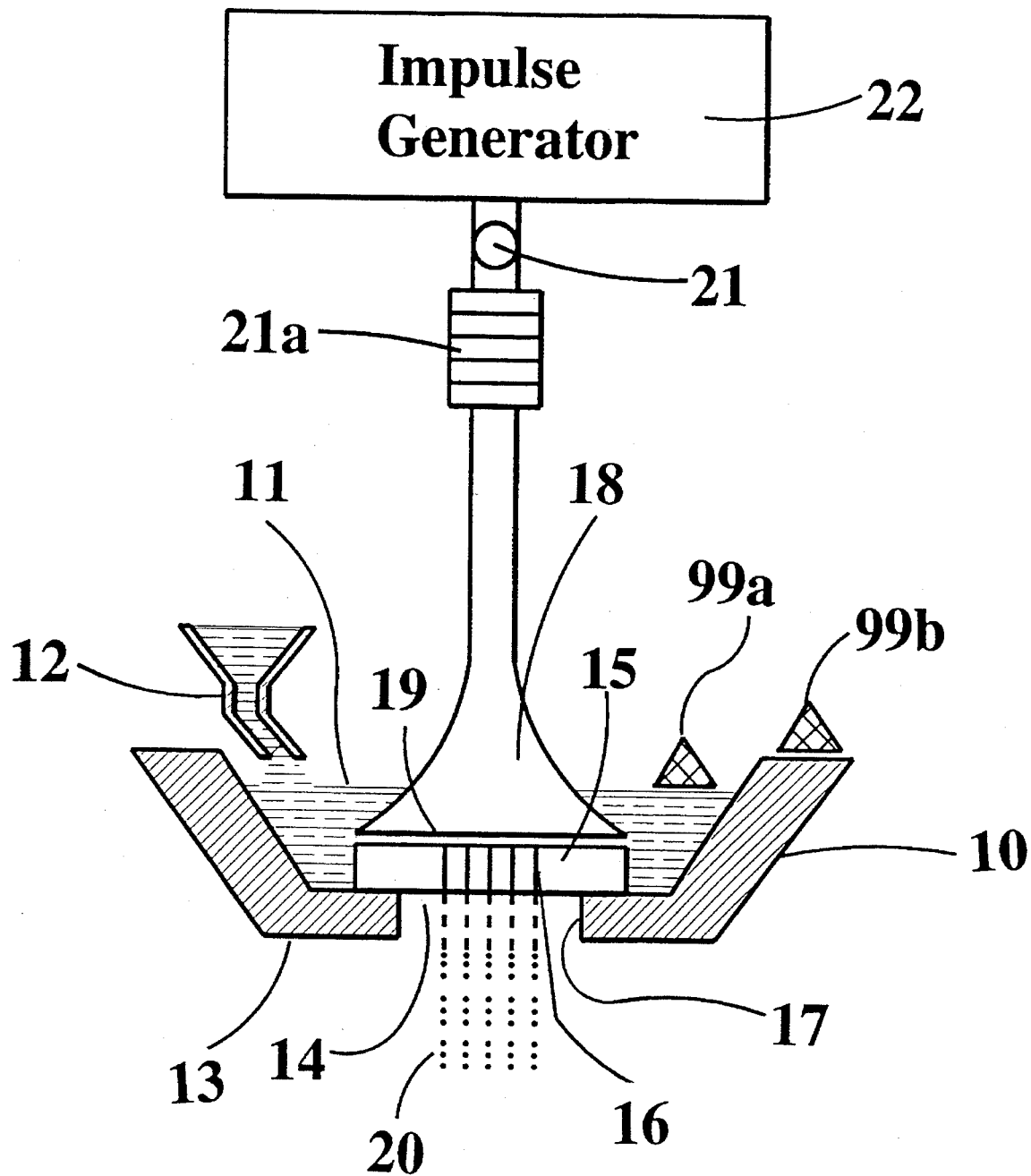
FIG. 4a shows a side view schematic of a further embodiment of the invention.

In FIG. 4a, a similar apparatus to that shown in FIG. 4 is shown with like parts having like numeral identification. The apparatus shown in FIG. 4a is suitable for varying the size distribution by using very high frequencies, particularly from about 5000 Hz to near 60,000 Hz. Besides the movable body 18, there is shown additional reciprocating bodies 99a and 99b powered by impulse generators that are not shown but that are similar to the impulse generator 22. The devices 99a and 99b cause a vibration in the fluid upstream of the openings 16. In this situation, the movable body 18 is oscillated at a relatively low frequency (in the order of 1000 Hz and lower) and high amplitude (3–5 mm) to produce elongate discrete fluid segments from the openings 16. At the same time, one or both of the reciprocating bodies 99a and 99b is oscillated at higher frequency (5000 Hz to 60,000 Hz) but lower amplitude (in the order of less than 1 mm) to produce a vibration in the fluid 11. The effect of the high frequency vibration in the fluid is to narrow the size distribution. For many substances, the optimum size distribution, with near monodisperse droplet formation, is obtained at optimum frequency. Due to the difficulty of obtaining impulse generators having a frequency of oscillation greater than about 5000 Hz with a sufficient amplitude for the practice of the invention (the optimum range for readily commercially available impulse generators being in the order of 100 Hz to 300 Hz with a high amplitude), for some materials it is believed necessary in practice to use an overlaid high frequency vibration to produce an optimum size distribution.

Figure 5:
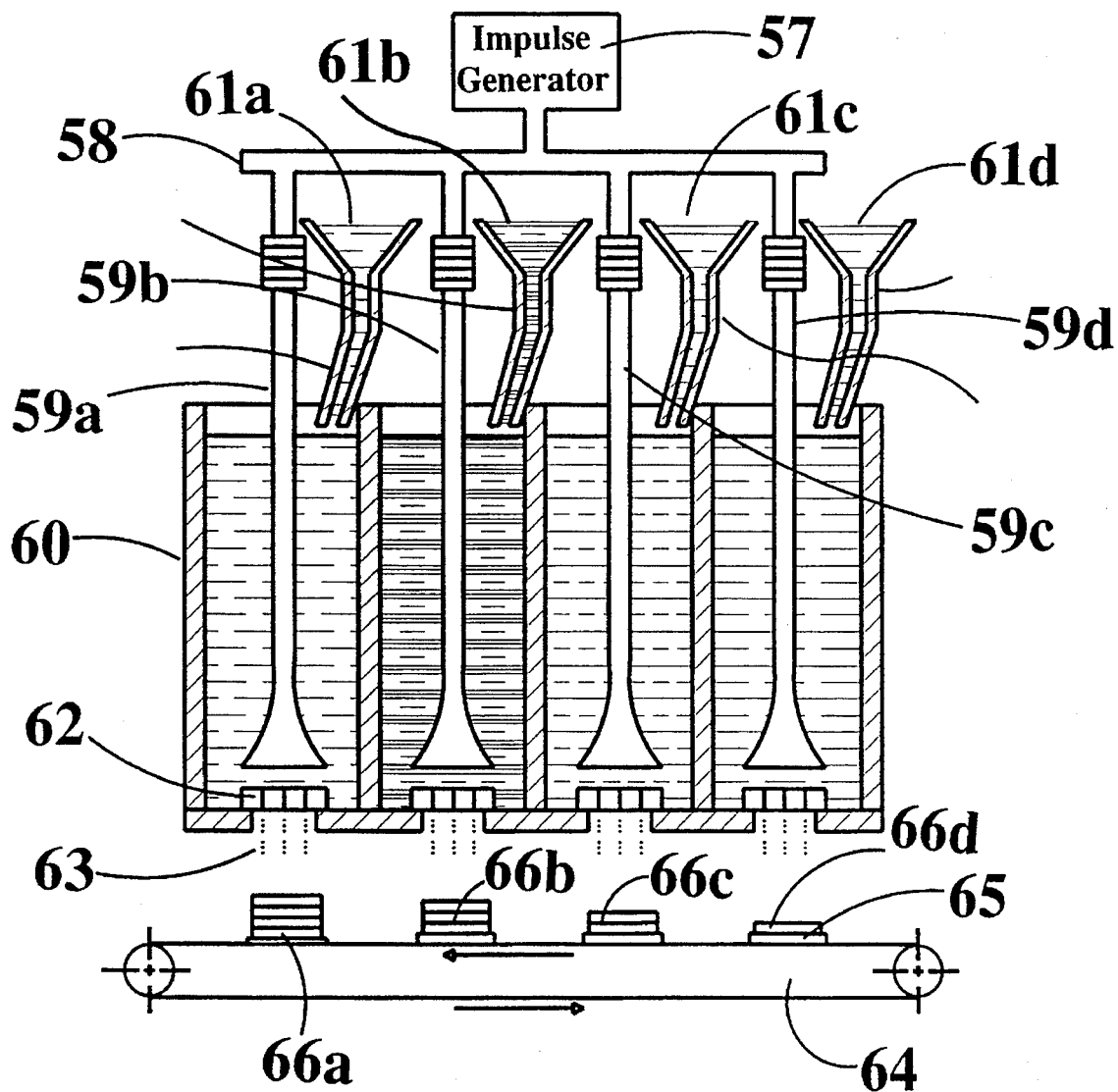
FIG. 5 shows a diagram of a system with several compartments used for the production of laminates.

FIG. 5 shows another application of the present invention in which laminated structures are fabricated on a continuous basis. The impulse generating device 57 is attached by means of connector 58 to a plurality of impulse applicators 59a, 59b, 59c, 59d. Alternatively, and not shown in the figure, a separate impulse generating device 57 could be attached to each applicator 59a–d using separate connectors. The tundish 60 is arranged into several compartments that are continuously supplied with different molten materials 61a, 61b, 61c, 61d. Nozzles 62 with suitable openings are sealed at the bottom of each compartment. By using an appropriate impulse amplitude and periodicity (hence force) from impulse generator 57, the molten material forms elongate discrete fluid segments 63 under each nozzle 62. A conveyor belt 64 is made to travel so that substrate 65 may be coated by droplets 63 or segments to make coatings 66a, 66b, 66c, 66d. As the substrate travels under the various compartments of the tundish 60, various coatings of different materials are applied thereto to form laminated structures. Of course, the substrate may also consist of a continuous sheet of metal or alloy. Alternatively, the deposit itself could be made into strip.

The operation of the present invention is illustrated using the following examples:

EXAMPLE 1

Figure 6A:
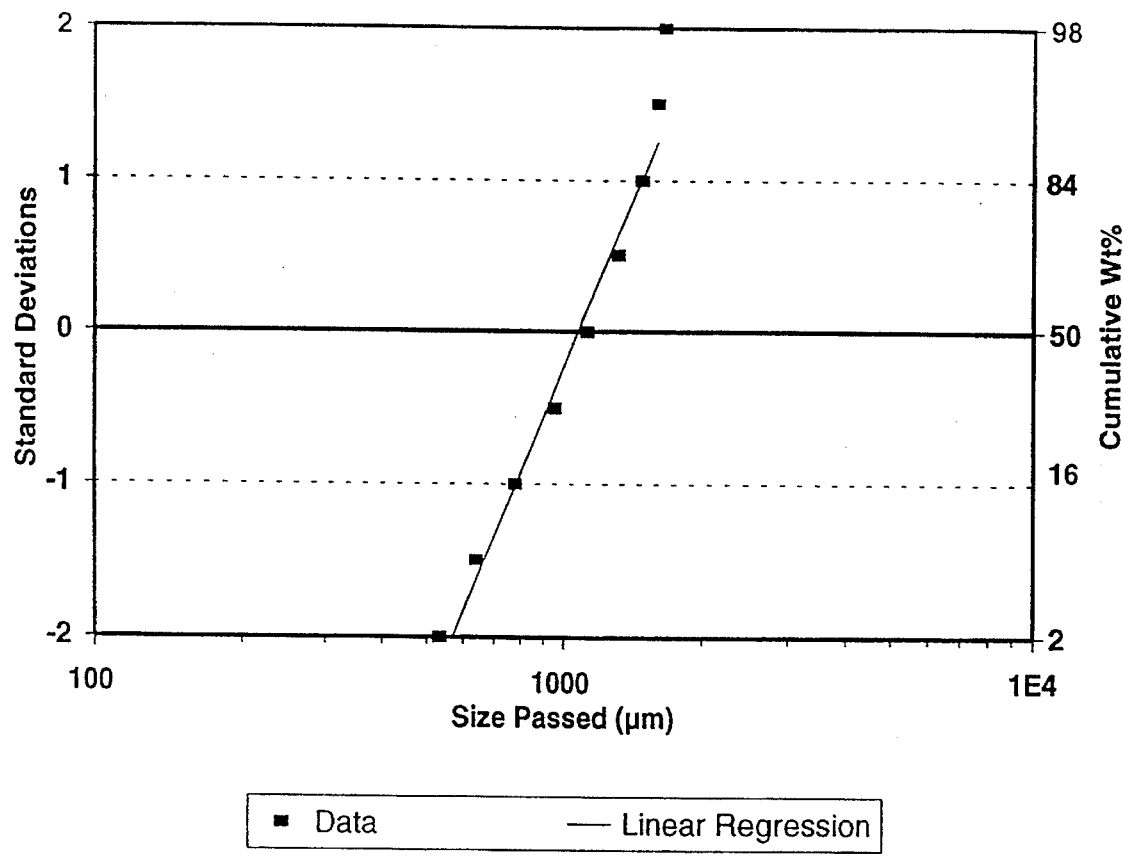
FIGS. 6a, 6b, 7a, 7b, 7c, 8, 9, 10 and 11 each show experimental results obtained from carrying out various aspects of the invention.
Figure 6B:
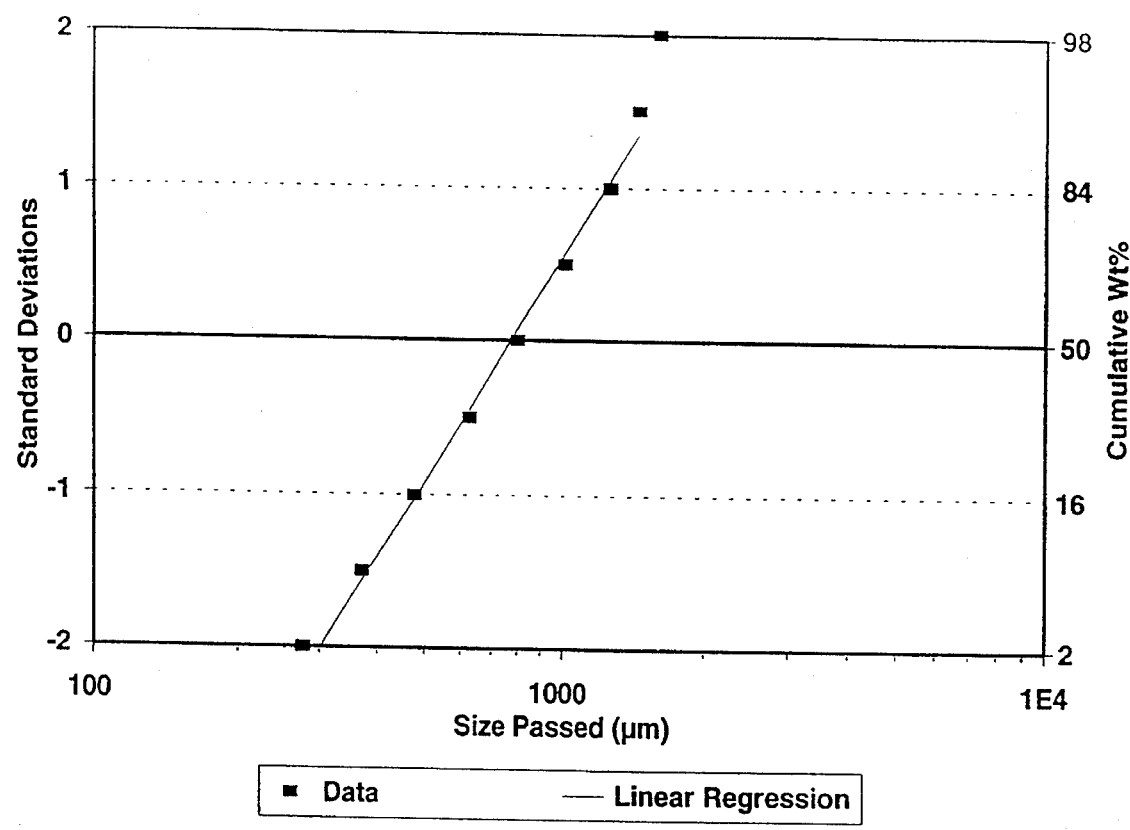

The following experiments were conducted to determine the effect of opening size on the particle size distribution using the impulse generator. An 88% Pb—12% Sn alloy was atomized at 400° C. using a ceramic impulse applicator. The fluid segments were allowed to fall in air and then quenched in water. The opening was of a circular geometry and had a nominal diameter of 500 µm. Nominal in this context means the openings were intended to be 500 µm in diameter, and were drilled as such, but the actual size may vary a few percent due to inaccuracies in the drilling method. The impulse force was applied with a frequency of 160 Hz and a stroke about 1 mm. FIG. 6a gives the particle size distribution on a log-probability graph. The resultant powder was either acicular or tear-drop in shape. The geometric mass mean size, $d_{50}$, of the powder was 1078 µm and the geometric standard deviation, $\sigma_g$, was 1.38. Another experiment was performed under the same conditions except that the opening diameter was decreased to 200 µm. The log-probability plot of the resultant powder is shown in FIG. 6b. The $d_{50}$ decreased to 775 µm while the $\sigma_g$ increased to 1.60.

EXAMPLE 2

Figure 7A:
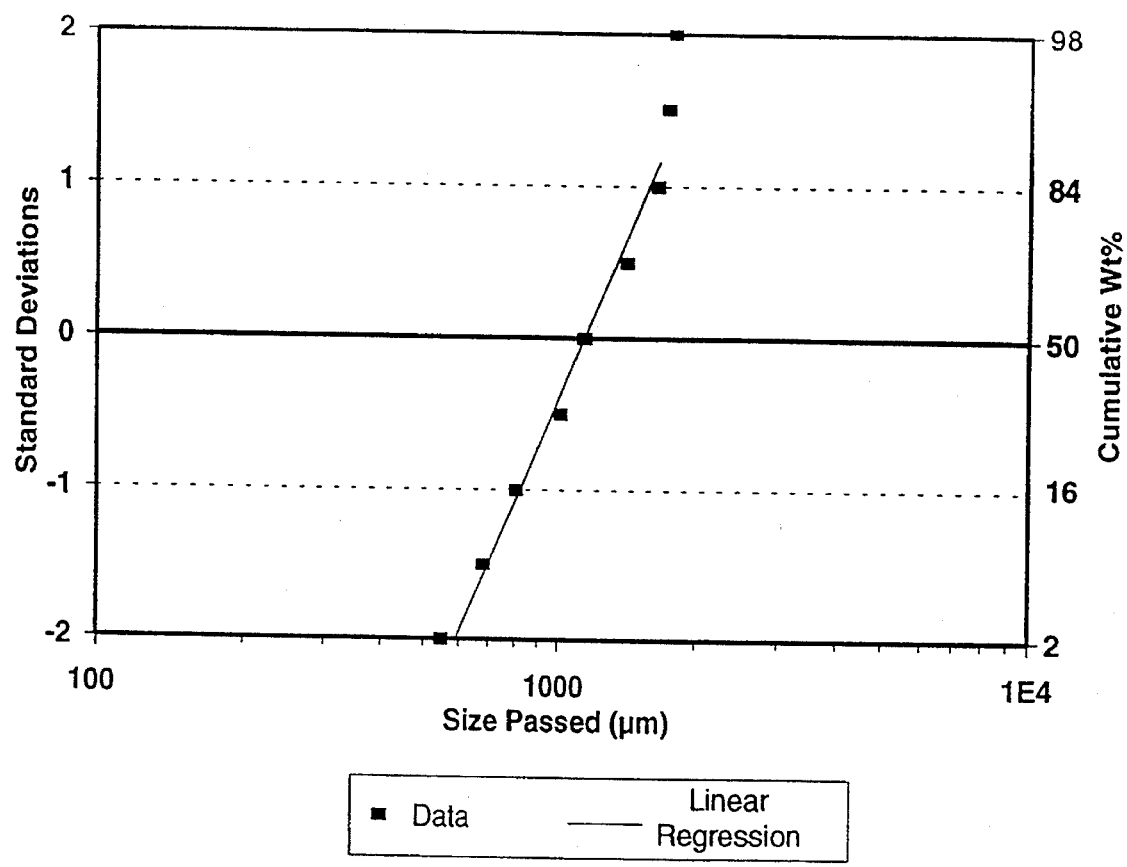
Figure 7B:
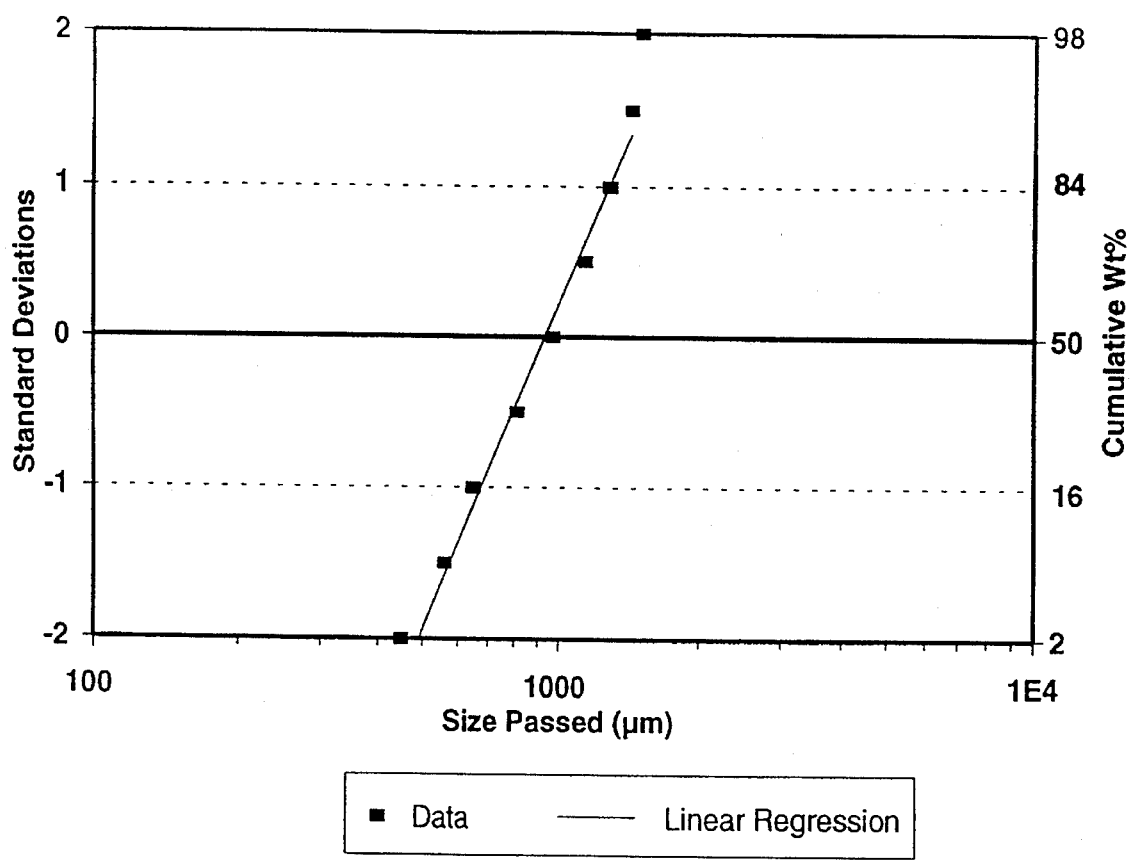
Figure 7C:
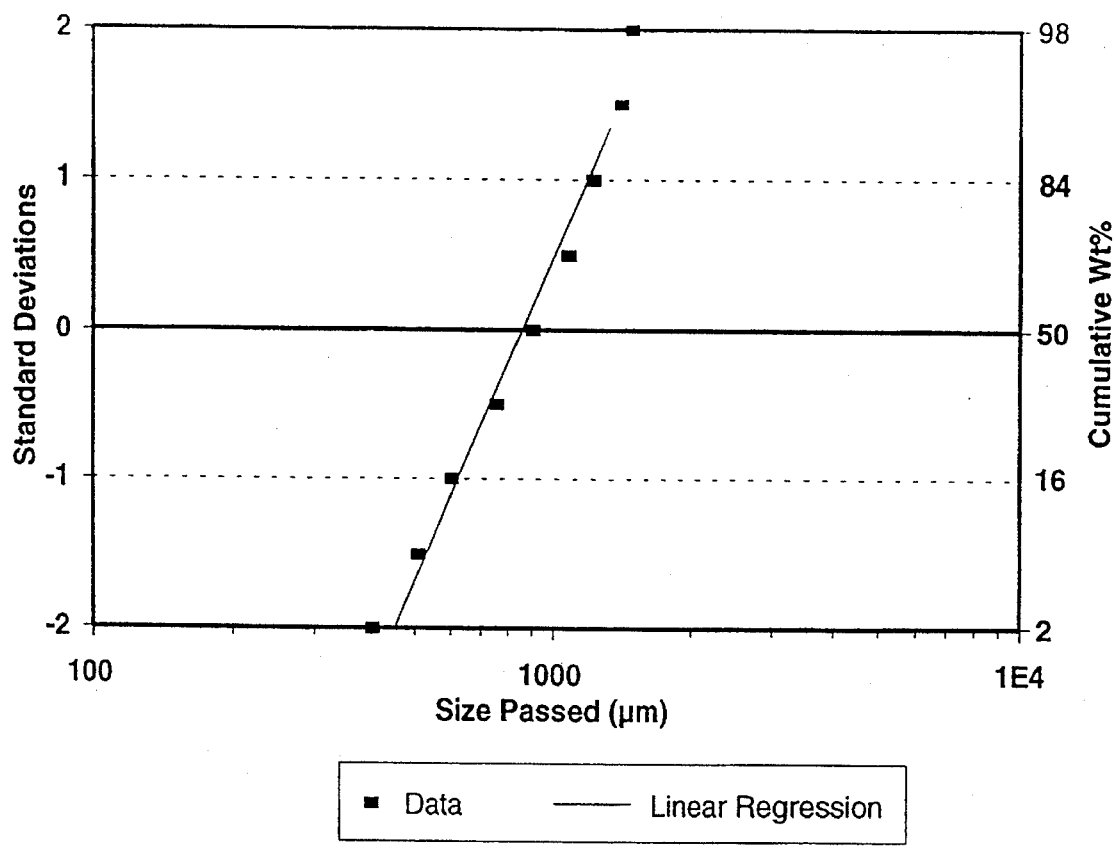

The following experiments were conducted to determine the effect of impulse force frequency on the particle size distribution using the impulse generator. A 88% Pb—12% Sn alloy was atomized at 400° C. and allowed to fall some distance in air and then quenched in water. The opening diameter was a nominal 500 µm. Three separate experiments were conducted at impulse force frequencies of 120, 200, and 240 Hz and a stroke about 1 mm. FIGS. 7a,b,c give the particle size distribution on a log-probability chart for these runs. The resultant powder was either acicular or tear-drop in shape. The geometric mass mean size of the powder decreased from 1123 µm at 120 Hz down to 899 m at 240 Hz. Correspondingly, the geometric standard deviation increased slightly from 1.34 to 1.49.

EXAMPLE 3

Figure 8:
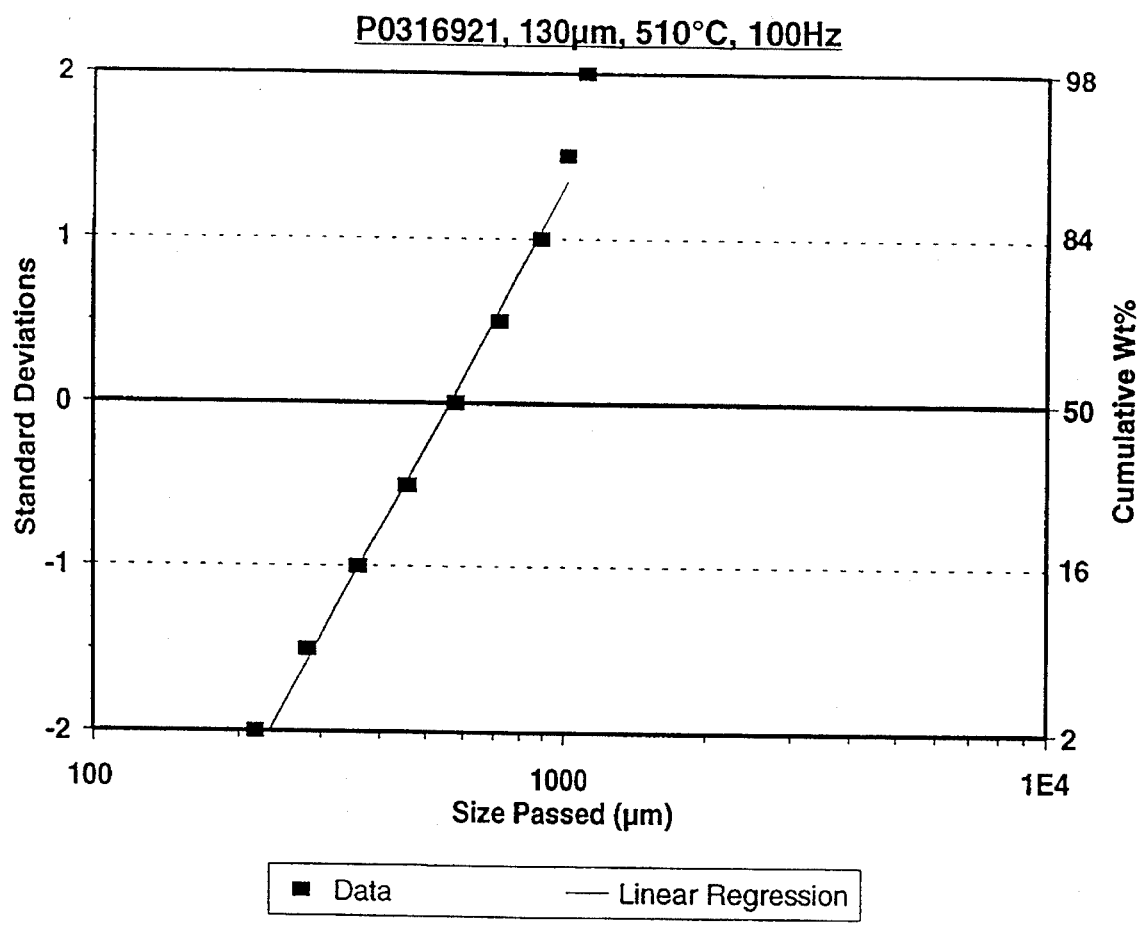

An atomization experiment was performed with the impulse atomizer using a nominal opening diameter of 130 µm and a Zn—Pb(500 ppm) alloy at 510° C. The impulse force was applied with a frequency of 100 Hz and a stroke about 1 mm and the ambient gas was air. FIG. 8 shows a log-probability plot of the resultant powder. The powder shape was either acicular or tear-drop in shape. The geometric mass mean of the distribution was 562 µm and the geometric standard deviation was 1.55.

EXAMPLE 4

Figure 9:
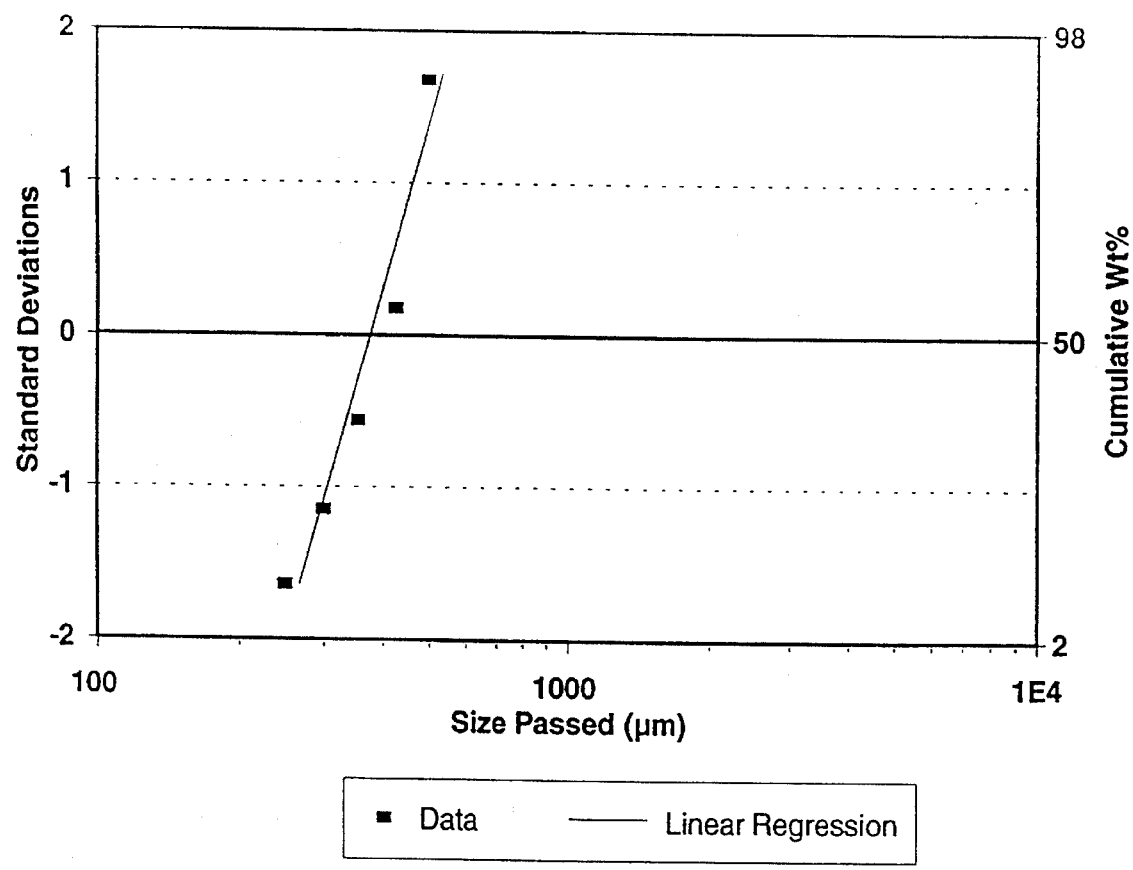

A Zn—500 ppm Pb melt was impulse atomized at 470° C. in an atmosphere of nitrogen containing 70 ppm oxygen. Seven collinear openings were drilled in a nozzle plate made of 2.5 mm thick ceramic. Each opening had a nominal diameter of 250 µm. A ceramic impulse applicator was positioned about 1.7 mm above the nozzle and an impulse force was applied at 100 Hz and a stroke about 1 mm and sufficient to eject elongate discrete fluid segments. The resultant powder was spherical in shape with a log-normal size distribution as shown in FIG. 9. The $d_{50}$ and $\sigma_g$ were found to be 368 µm and 1.25, respectively.

EXAMPLE 5

Figure 10:
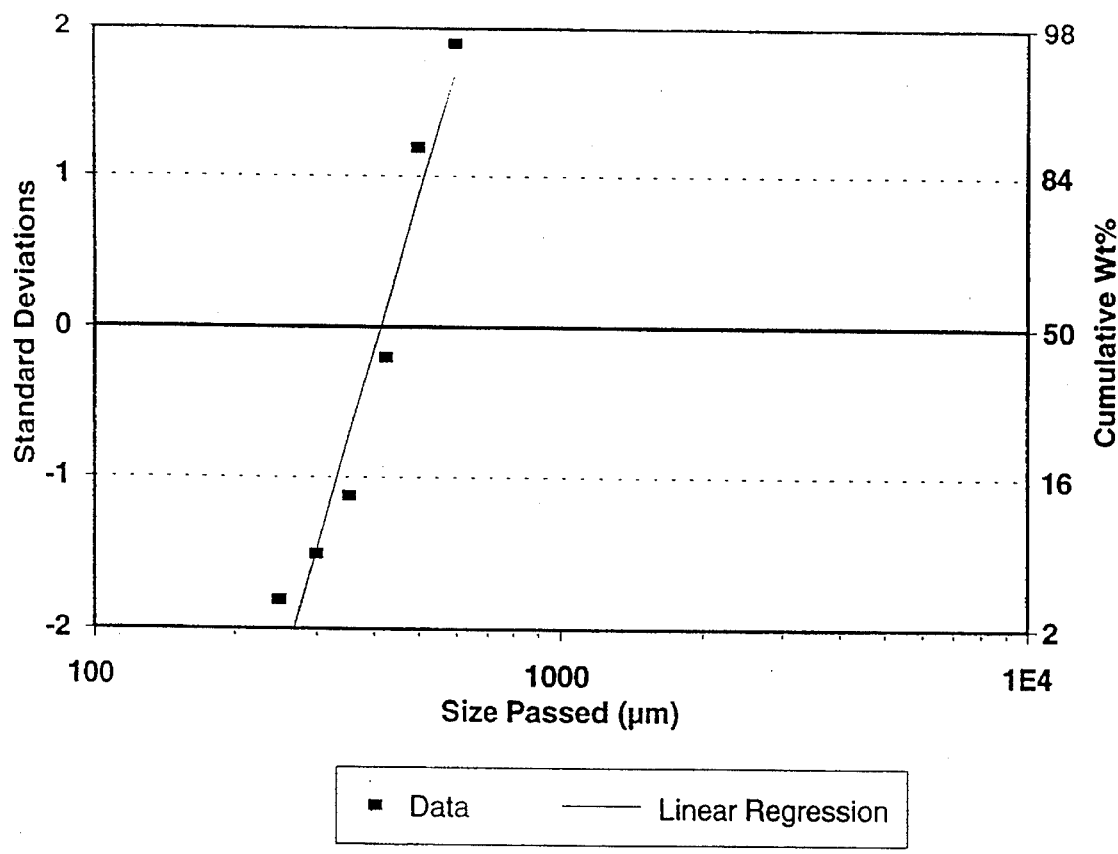

A 17% Cu—Al alloy melt was impulse atomized at 700° C. in an atmosphere of nitrogen containing 65 ppm oxygen. A nozzle made of ceramic was arranged at the bottom of a ceramic crucible containing the melt. Seven collinear openings were drilled in a nozzle and each opening had a nominal diameter of 130 µm. A ceramic impulse applicator was positioned about 1.3 mm above the nozzle and an impulse force was applied at 100 Hz and a stroke between 1 mm so as to eject liquid as elongate discrete fluid segments. The resultant powder was spherical in shape with a log-normal size distribution as shown in FIG. 10. The $d_{50}$ and $\sigma_g$ were found to be 412 µm and 1.25, respectively.

EXAMPLE 6

Figure 11:
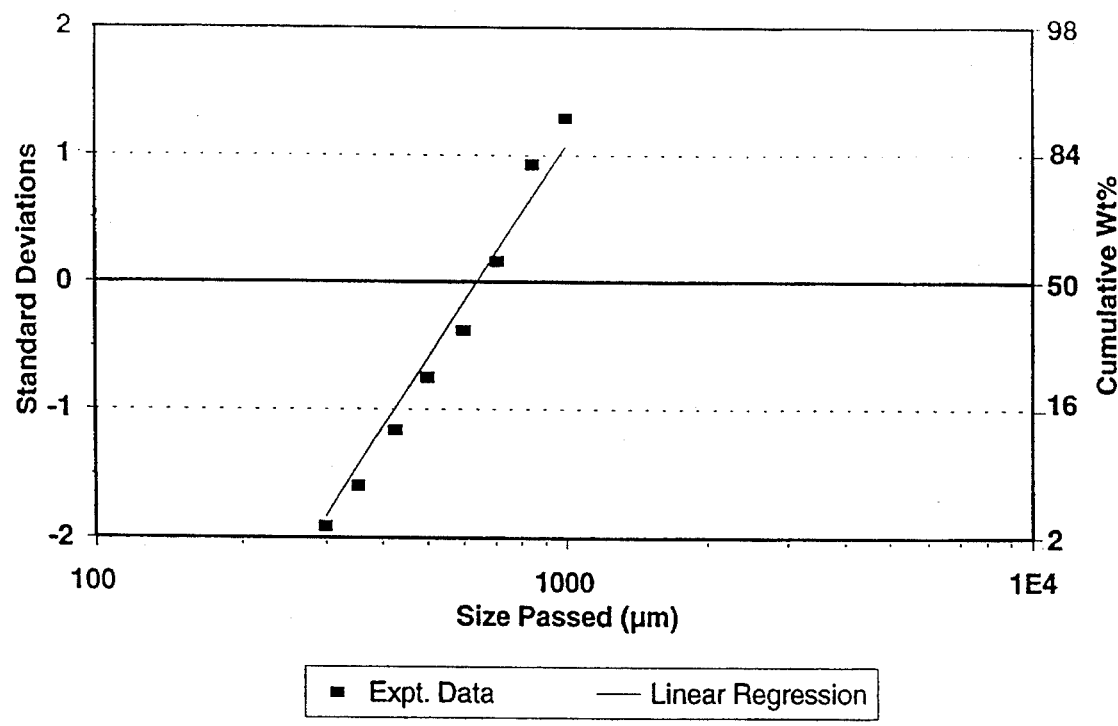

A batch of pure copper was placed in a ceramic crucible and impulse atomized at 1200° C. in an atmosphere of nitrogen containing 10 ppm oxygen. A ceramic nozzle with seven collinear openings of 250 µm nominal diameter was arranged at the bottom of a ceramic crucible containing the melt. A ceramic impulse applicator was positioned about 1.3 mm above the nozzle and an impulse force was applied at 100 Hz and a stroke about 1 mm so as to eject liquid as elongate discrete fluid segments. The resultant powder was spherical in shape with a log-normal size distribution as shown in FIG. 11. The $d_{50}$ and $\sigma_g$ were found to be 640 µm and 1.5, respectively.

EXAMPLE 7

A batch of a Nd—Fe—B alloy was placed in a ceramic crucible and impulse atomized between 1300°–1400° C. in an atmosphere of argon containing 50 ppm oxygen. A ceramic nozzle with thirty seven openings of 250 µm nominal diameter was arranged at the bottom of a ceramic crucible containing the melt. A ceramic impulse applicator was positioned about 1.4 mm above the nozzle and an impulse force was applied at 100 Hz and a stroke about 1 mm so as to eject liquid as elongate discrete fluid segments. The powder produced was spherical in shape with sizes ranged from 390 to 744 µm. A microscopic examination of various particles reveals a generally uniform dendritic structure of the magnetic phase, $Fe_{14}Nd_2B$ ($\phi$), that ranges in size from 10–80 µm depending on the particle size.

A person skilled in the art could make immaterial modifications to the invention described and claimed in this patent without departing from the essence of the invention.

The embodiments of the invention in which an exclusive property or privilege is claimed are defined as follows:

1. A method of atomizing a fluid, the fluid being held in a container having an inside and an outside, the container having an opening communicating between the inside and the outside of the container, the method comprising the steps of:

positioning the fluid adjacent the opening in the container under a pressure such that a continuous stream of fluid does not pass through the opening; and repetitively applying impulses to the fluid in the direction of the opening with a frequency of at least 10 Hz, the impulses being sufficient to impel the fluid through the opening as elongate discrete fluid segments.

2. The method of claim 1 in which the pressure on the fluid adjacent the opening inside the container is greater than the pressure on the outside of the container adjacent the opening.

3. The method of claim 1 in which each elongate discrete fluid segment breaks up into droplets after being impelled through the opening.

4. The method of claim 1 in which the impulse has an amplitude and the amplitude of the impulse is between 0.1 mm and 8 mm.

5. The method of claim 4 in which the amplitude of the impulse is between 1 mm and 2 mm.

6. The method of claim 4 in which there are plural openings in the container and the amplitude of the impulses is the same for each opening.

7. The method of claim 4 in which the impulses are applied to the fluid by positioning a movable body spaced from the opening and moving the movable body towards and away from the opening using a generator of impulses attached to the movable body, the impulses being characterized by having an amplitude and frequency such that upon movement of the movable body towards and away from the opening the fluid is impelled through the opening as elongate discrete fluid segments.

8. The method of claim 7 in which the fluid includes liquid metal or alloy and the container is a crucible.

9. The method of claim 4 further including vibrating the fluid upstream of the openings at a frequency higher than the frequency of the impulses applied to the fluid, whereby a monodisperse distribution of droplets is formed from the discrete fluid segments.

10. The method of claim 1 in which the opening has a size such that the fluid does not pass through the opening under gravity without the application of exterior forces.

11. The method of claim 1 further including spraying the fluid segments onto a substrate.

12. The method of claim 1 further including contacting the fluid segments with a spray of secondary material to form composite droplets.

13. The method of claim 1 further including cooling the fluid segments.

14. The method of claim 1 further including directing the discontinuous stream of fluid through a gas to react the stream of fluid with the gas.

15. The method of claim 1 in which the opening forms a slit and the elongate discrete fluid segments are lamellar in shape.

16. The method of claim 1 in which there are plural openings in the container communicating between the inside and outside of the container.

* * * * *